(12) United States Patent
Ochiai et al.

(10) Patent No.: US 10,374,233 B2
(45) Date of Patent: Aug. 6, 2019

(54) METHOD OF MANUFACTURING ELECTRODE SLURRY FOR LITHIUM SECONDARY BATTERY, AND ELECTRODE SLURRY

(71) Applicant: FDK CORPORATION, Tokyo (JP)

(72) Inventors: Yuki Ochiai, Tokyo (JP); Keita Yamamoto, Tokyo (JP)

(73) Assignee: FDK CORPORATION, Tokyo (JP)

(*) Notice: Subject to any disclaimer, the term of this patent is extended or adjusted under 35 U.S.C. 154(b) by 0 days.

(21) Appl. No.: 14/778,403

(22) PCT Filed: Mar. 11, 2014

(86) PCT No.: PCT/JP2014/056373
§ 371 (c)(1),
(2) Date: Sep. 18, 2015

(87) PCT Pub. No.: WO2014/148322
PCT Pub. Date: Sep. 25, 2014

(65) Prior Publication Data
US 2016/0276670 A1    Sep. 22, 2016

(30) Foreign Application Priority Data
Mar. 18, 2013 (JP) .................. 2013-055264

(51) Int. Cl.
*H01M 4/62* (2006.01)
*H01M 4/00* (2006.01)
(Continued)

(52) U.S. Cl.
CPC ......... *H01M 4/625* (2013.01); *H01M 4/0404* (2013.01); *H01M 4/13* (2013.01);
(Continued)

(58) Field of Classification Search
CPC ... H01M 4/625; H01M 4/622; H01M 10/0525
(Continued)

(56) References Cited

U.S. PATENT DOCUMENTS

2007/0231690 A1* 10/2007 Fujita ................. H01M 4/131
429/209
2010/0261061 A1 10/2010 Yuasa et al.
(Continued)

FOREIGN PATENT DOCUMENTS

JP   H10-144302 A   5/1998
JP   2007-048692 A  2/2007
(Continued)

OTHER PUBLICATIONS

International Search Report for PCT/JP2014056373, ISA/JP, dated Apr. 8, 2914.
(Continued)

*Primary Examiner* — Harold Y Pyon
*Assistant Examiner* — Danny N Kang
(74) *Attorney, Agent, or Firm* — Harness, Dickey & Pierce, P.L.C.

(57) ABSTRACT

Slurry is prepared by dispersing a solvent containing fibrous carbon (carbon nanotube, vapor grown carbon fiber (VGCF (registered trademark))) by using a media-type disperser, and the slurry to be applied to a collector is obtained by kneading the prepared slurry and an electrode active material. As a media-type disperser, for example, a ball mill disperser or a bead mill disperser is used. The dispersion using the media-type disperser is performed for 5 to 10 hours. As a dispersant, for example, at least any one of a nonionic dispersant, an ethylenic dispersant, a polymeric dispersant and an amine dispersant is used. The dispersion is performed so that a fiber length of the fibrous carbon becomes 2 to 7 μm.

8 Claims, 20 Drawing Sheets

(51) Int. Cl.
*H01M 4/13* (2010.01)
*H01M 4/139* (2010.01)
*H01M 4/04* (2006.01)
*H01M 10/0525* (2010.01)
*H01M 4/131* (2010.01)
*H01M 4/1391* (2010.01)
*H01M 10/052* (2010.01)

(52) U.S. Cl.
CPC ........... *H01M 4/139* (2013.01); *H01M 4/622* (2013.01); *H01M 10/0525* (2013.01); *H01M 4/131* (2013.01); *H01M 4/1391* (2013.01); *H01M 10/052* (2013.01)

(58) Field of Classification Search
USPC .................................................. 252/500, 511
See application file for complete search history.

(56) References Cited

U.S. PATENT DOCUMENTS

2012/0107683 A1    5/2012  Kim et al.
2012/0315541 A1*  12/2012  Sasaki .................. H01M 4/131
                                                                    429/211
2014/0186699 A1    7/2014  Kato et al.

FOREIGN PATENT DOCUMENTS

| JP | 2010-238575 A | 10/2010 | |
|----|---|---|---|
| JP | 2011-060432 A | 3/2011 | |
| JP | 2011-063458 A | 3/2011 | |
| JP | 2011-162698 A | 8/2011 | |
| JP | 2011162698 A * | 8/2011 | |
| JP | 2012-022872 A | 2/2012 | |
| WO | WO-2012-036172 A1 | 3/2012 | |
| WO | WO 2012036172 A1 * | 3/2012 | ............... H01B 1/24 |
| WO | WO-2012/161180 A1 | 11/2012 | |

OTHER PUBLICATIONS

JPO Office Action dated Mar. 1, 2017 in the parallel application JP 2013-055264, with English translation thereof.
Submission to Japanese Patent Office in corresponding application JP2013-55264, dated Sep. 20, 2017, with English translation attached.

* cited by examiner

COMPOUNDING RATIO

| | NAME | MANUFACTURER | COMPOUNDING RATIO |
|---|---|---|---|
| CONDUCTIVE MATERIAL | VAPOR GROWN CARBON FIBER (VGCF) | Showa Denko K. K. | 10 g |
| DISPERSANT | S3M-64 (NONIONIC POLYMER) | NOF CORPORATION | 1 g |
| Zr BALL | Zr BALL (Ø3) | — | 1000 g |
| ULTRAPURE WATER | — | — | 200 g |

FIG. 4

MEASUREMENT RESULT OF PARTICLE SIZE

|  | | TREATMENT TIME | MEDIAN DIAMETER (μm) |
|---|---|---|---|
| SAMPLE 0 | — | 0 hrs | 49.40 |
| SAMPLE 1 | WITH DISPERSANT | 5 hrs | 2.56 |
| SAMPLE 2 | | 20 hrs | 1.50 |
| SAMPLE 3 | | 25 hrs | 1.22 |
| SAMPLE 4 | WITHOUT DISPERSANT | 20 hrs | 30.07 |
| SAMPLE 5 | | 24 hrs | 27.64 |

FIG. 5

BEFORE DISPERSION TREATMENT (SAMPLE 0)

AFTER DISPERSION TREATMENT, WITH DISPERSANT (SAMPLE 3)

AFTER DISPERSION TREATMENT, WITHOUT DISPERSANT (SAMPLE 5)

|  | SAMPLE 0 | SAMPLE 3 | SAMPLE 5 |
|---|---|---|---|
| STIFFENED SOLID CONTENT | 69.93% | 68.88% | 61.26% |
| MEASURED FINAL SOLID CONTENT | 60.20% | 59.90% | 60.20% |
| VISCOSITY 5DN | 17.67 Pa·s | 5.47 Pa·s | 15.92 Pa·s |
| ELASTIC MODULUS G' | 2100 Pa | 1410 Pa | 246 Pa |
| ELASTIC MODULUS G'' | 1500 Pa | 295 Pa | 183 Pa |
| tan δ | 0.70 | 0.15 | 0.73 |

FIG. 7

| | |
|---|---|
| COATING SPEED | 100 mm/min |
| THICKNESS OF PASTE | 150 μm (AFTER DRYING) |
| DRYING TEMPERATURE | 60°C |
| DRYING TIME | 10 min |

FIG. 8

| SURFACE ROUGHNESS | | SAMPLE 0 | SAMPLE 3 | SAMPLE 5 |
|---|---|---|---|---|
| | Ra | 5.45 | 3.32 | 3.72 |
| | Ry | 28.98 | 18.38 | 24.23 |
| | Rz | 8.65 | 13.24 | 12.11 |

FIG. 9

BEFORE DISPERSION TREATMENT SAMPLE 0

AFTER DISPERSION TREATMENT (WITH DISPERSANT) SAMPLE 3

AFTER DISPERSION TREATMENT (WITHOUT DISPERSANT) SAMPLE 5

|  | NAME | MANUFACTURER | COMPOUNDING RATIO |
|---|---|---|---|
| CONDUCTIVE MATERIAL | VGCF-H | Showa Denko K.K. | 10 |
| DISPERSANT | S3M-64 (NONIONIC POLYMER) | NOF CORPORATION | 1 |
| WATER | ION-EXCHANGED WATER | — | 200 |

FIG. 11

| | SAMPLE 10 | SAMPLE 11 | SAMPLE 12 | SAMPLE 13 | SAMPLE 14 | SAMPLE 15 |
|---|---|---|---|---|---|---|
| TREATMENT TIME (hr) | 0 | 1 | 3 | 5 | 10 | 25 |
| AVERAGE PARTICLE SIZE (μm) | 69.25 | 4.06 | 5.04 | 3.90 | 3.00 | 2.64 |
| MODE DIAMETER (μm) | 47.94 | 5.49 | 5.49 | 5.47 | 4.19 | 3.65 |

FIG. 12

SEM IMAGES OF CARBON SLURRY

SAMPLE 10 (0 hrs)

SAMPLE 11 (1 hr)

SAMPLE 12 (3 hrs)

SAMPLE 13 (5 hrs)

SAMPLE 14 (10 hrs)

SAMPLE 15 (25 hrs)

SEM IMAGES OF COATED SURFACE

SAMPLE 10 (0 hrs)

SAMPLE 11 (1 hr)

SAMPLE 12 (3 hrs)

SAMPLE 13 (5 hrs)

SAMPLE 14 (10 hrs)

SAMPLE 15 (25 hrs)

LASER MICROSCOPE IMAGES OF COATED SURFACE

SAMPLE 10 (0 hrs)

SAMPLE 11 (1 hr)

SAMPLE 12 (3 hrs)

SAMPLE 13 (5 hrs)

SAMPLE 14 (10 hrs)

SAMPLE 15 (25 hrs)

| FIBER LENGTH (μm) | 1.22 | 1.53 | 2.85 | 5.51 | 10.87 | 27.64 |
|---|---|---|---|---|---|---|
| CAPACITY ATTENUATION RATE (%) | 20.0 | 16.7 | 4.2 | 8.2 | 15 | 28 |

FIG. 17A

METHOD OF MANUFACTURING ELECTRODE SLURRY FOR LITHIUM SECONDARY BATTERY, AND ELECTRODE SLURRY

CROSS-REFERENCE TO RELATED APPLICATIONS

This application is a 371 U.S. National Stage of International Application No. PCT/JP2014/056373, filed on Mar. 11, 2014, which claims priority to and the benefit of Japanese Patent Application No. 2013-055264, filed Mar. 18, 2013. The entire disclosures of the above applications are incorporated herein by reference.

TECHNICAL FIELD

The present invention relates to a method of manufacturing electrode slurry for a lithium secondary battery, and electrode slurry. In particular, the present invention relates to electrode slurry for the lithium secondary battery using fibrous carbon as a conductive material.

BACKGROUND ART

In response to need for performance enhancement of mobile devices, hybrid vehicles, electric vehicles and the like, an increase of energy density and an improvement of charge and discharge characteristics have been required for lithium secondary batteries (lithium secondary batteries). In recent years, it has been considered that fibrous carbon such as a carbon nanotube having excellent electron conductivity, thermal conductivity and mechanical strength characteristics is used as an electrode material of the lithium secondary battery in order to further improve performance of the lithium secondary battery.

For example, Patent Literature 1 describes that, for the purpose of increasing discharge capacity, improving cycle characteristics and the like, a multilayer carbon nanotube as a conductive material synthesized by a vapor phase method is mixed with a positive electrode active material, this mixture is dispersed in a solvent (water or an organic solvent) obtained by dissolving a dispersant such as CMC (carboxylmethylcellulose) to prepare a slurry solution, and the prepared slurry solution is applied on a positive electrode collector.

Further, Patent Literature 2 describes that, in order to enhance handling property of a carbon nanotube which is a fibrous material having a large aspect ratio and improve conductivity as a conductive auxiliary agent for an electrode of a lithium secondary battery, orientation of the carbon nanotube, the content of Ca and the like are adjusted.

Further, Patent Literature 3 describes that, in order that fine carbon fibers such as carbon nanotubes, which are existing in an aggregate state, can be used as a battery electrode material, a mixture of an aggregate of the carbon fibers and solid particles whose sizes are limited is kneaded with a shear force applied to the mixture, and thus the particles covered with the fine carbon fibers can be obtained.

CITATION LIST

Patent Literature

Patent Literature 1: Japanese Patent Application Laid-open Publication No. 2010-238575

Patent Literature 2: Japanese Patent Application Laid-open Publication No. 2011-63458

Patent Literature 3: Japanese Patent Application Laid-open Publication No. 2011-60432

SUMMARY OF THE INVENTION

Technical Problem

Fibrous carbon having a large aspect ratio such as a carbon nanotube exists in a bundle state where fibers are mutually entangled by an action force such as a Van der Waals force when in a solid state. Thus, for example, in a case of a conventional method in which an active material is used as a dispersion medium, and the active material and the fibrous carbon as a conductive material are strongly kneaded by a kneader (mixer) or the like, it has been difficult to obtain slurry which has been appropriately dispersed to be applied on the electrode.

The present invention has been made to solve the above-mentioned problems, and an advantage thereof is to provide a method of manufacturing electrode slurry for a lithium secondary battery and to provide electrode slurry, in which the fibrous carbon can be used as a conductive material and performance of the lithium secondary battery can be improved.

Solution to Problem

One aspect of the present invention for achieving the above advantage is a method of manufacturing electrode slurry for a lithium secondary battery, the method including: dispersing a solvent using a media-type disperser to obtain the slurry, the solvent containing fibrous carbon; and kneading the slurry and an electrode active material to obtain the slurry to be applied to a collector.

Another aspect of the present invention is the manufacturing method, wherein the media-type disperser is a ball mill disperser.

Another aspect of the present invention is the manufacturing method, wherein the media-type disperser is a ball mill disperser using zirconia balls (Zr balls) as media.

Another aspect of the present invention is the manufacturing method, wherein the solvent is dispersed for 5 to 10 hours by the ball mill disperser.

Another aspect of the present invention is the manufacturing method, wherein the media-type disperser is a bead mill disperser.

Another aspect of the present invention is the manufacturing method, wherein the fibrous carbon is a carbon nanotube.

Another aspect of the present invention is the manufacturing method, wherein the fibrous carbon is a vapor grown carbon fiber (VGCF (registered trademark)).

Another aspect of the present invention is the manufacturing method, wherein the solvent contains a dispersant.

Another aspect of the present invention is the manufacturing method, wherein the dispersant is at least one of a nonionic dispersant, an ethylenic dispersant, a polymeric dispersant and an amine dispersant.

Another aspect of the present invention is the manufacturing method, wherein a fiber length of the fibrous carbon is 2 to 7 μm.

Another aspect of the present invention is electrode slurry for a lithium secondary battery, the electrode slurry being manufactured by the above-stated manufacturing method.

In addition, the problems and solutions of the present invention will become clear through Description of Embodiments and the accompanying drawings.

Advantageous Effects of Invention

According to the present invention, the fibrous carbon can be used as a conductive material, and thus performance of the lithium secondary battery can be improved.

BRIEF DESCRIPTION OF DRAWINGS

FIG. 4 is a table showing a compounding ratio of a conductive material (VGCF), a dispersant, zirconia balls (Zr balls) and ultrapure water.

FIG. 5 is a table showing measurement results of a particle size of each sample.

FIG. 7 is a table showing measurement results of viscosity and elastic modulus of the sample 0 (before dispersion treatment), the sample 3 (after dispersion treatment (with dispersant)) and the sample 5 (after dispersion treatment (without dispersant)).

FIG. 8 is a table showing a condition of a coating test.

FIG. 9 is a table showing measurement results of surface roughness of respective samples after the coating and drying.

FIG. 11 is a table showing composition of each sample in an evaluation of a treatment time.

FIG. 12 is a table showing measurement results of a particle size of each sample in the evaluation of the treatment time.

FIG. 17A is a table showing a result obtained by measuring a relationship between a fiber length of VGCF in the negative electrode slurry and a charge-discharge three-cycle capacity attenuation rate.

DESCRIPTION OF EMBODIMENTS

Cross Reference to Related Applications

The present application claims priority upon Japanese Patent Application No. 2013-055264 filed on Mar. 18, 2013, which is herein incorporated by reference.

Hereinafter, an embodiment of the present invention will be described in detail with reference to the drawings.

1. Electrode Slurry Preparation Step 1-1. Comparison Step

Figure 1:
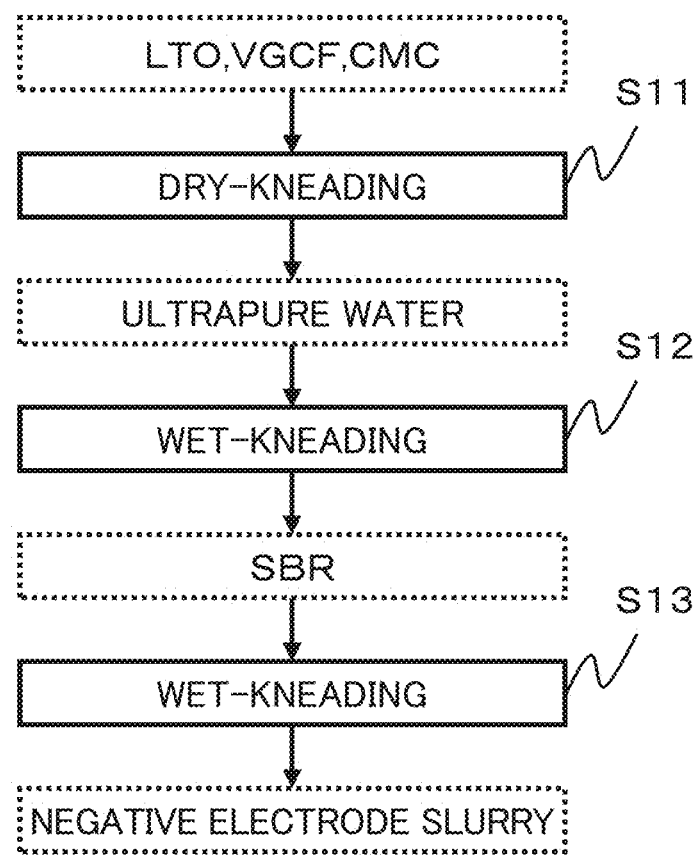
FIG. 1 is a flow chart describing a preparation step (comparison step S10) of negative electrode slurry for a lithium secondary battery, as a comparison example of a negative electrode slurry preparation step S20.

FIG. 1 shows a preparation step of negative electrode slurry for a lithium secondary battery, and this step is shown as a comparison example (hereinafter, also referred to as a comparison step S10) of a negative electrode slurry preparation step S20 described later. In this comparison step S10, a negative electrode active material, a conductive material (fibrous carbon) and a binder are strongly kneaded by a kneader (mixer) and are dispersed to obtain negative electrode slurry.

As shown in FIG. 1, in the comparison step S10, LTO (lithium titanate) as a negative electrode active material, VGCF (registered trademark) (Vapor Grown Carbon Fiber (VGCF)) (manufactured by Showa Denko K. K. (registered trademark)) as a conductive material, and CMC (CarboxyMethylCellulose) as a binder are firstly dry-kneaded by means of a kneader (2P-03 type, manufactured by PRIMIX Corporation (registered trademark)) (S11).

Then, ultrapure water is added to the kneaded material obtained by the dry-kneading described above as a solvent, and the kneaded material to which the solvent has been added is wet-kneaded by the kneader described above (S12).

After that, SBR (Styrene-Butadiene Rubber) as a binder for a negative electrode is added to the kneaded material obtained by the wet-kneading described above, and the kneaded material is wet-kneaded by the kneader described above (S13) to obtain negative electrode slurry as a resultant material.

1-2. Negative Electrode Slurry Preparation Step

Figure 2:
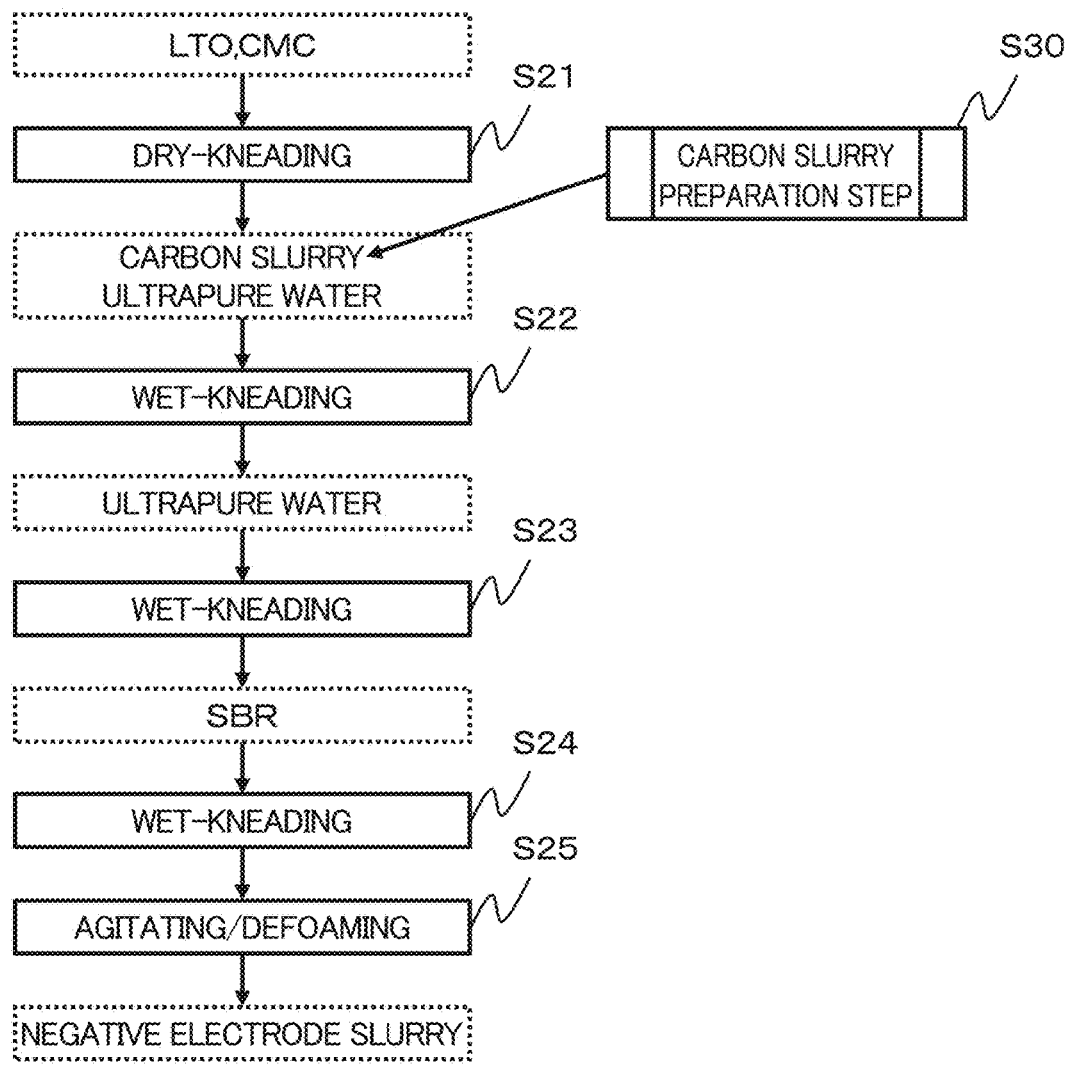
FIG. 2 is a flow chart describing a negative electrode slurry preparation step S20.

FIG. 2 shows a preparation step of negative electrode slurry (hereinafter, also referred to as a negative electrode slurry preparation step S20). In the comparison step S10 described above, the electrode active material, the fibrous carbon as a conductive material and the binder are dispersed by being strongly kneaded by the kneader to obtain the negative electrode slurry. However, in the negative electrode slurry preparation step S20, the fibrous carbon (conductive material) is not dispersed when the kneading is performed with the electrode active material as in the comparison step S10, and slurry in which the fibrous carbon has been dispersed (hereinafter, also referred to as carbon slurry) is separately prepared in a step (hereinafter, also referred to as a carbon slurry preparation step S30) independent of the step in which the electrode active material is kneaded. Then, this prepared slurry is kneaded with the kneaded material containing the electrode active material and the binder.

As shown in FIG. 2, in the negative electrode slurry preparation step S20, LTO as a negative electrode active material and CMC as a binder are firstly dry-kneaded (10 rpm→10 min, 30 rpm→15 min) by a kneader (manufactured by PRIMIX Corporation (registered trademark), 2P-03 type) (S21).

Next, ultrapure water and carbon slurry prepared in the carbon slurry preparation step S30 described later are added to the kneaded material obtained by the dry-kneading described above, and then the kneaded material is wet-kneaded (30 rpm→10 min, 70 rpm→60 min) by the kneader described above (S22).

Then, ultrapure water is further added to the kneaded material obtained by the wet-kneading described above, and the kneaded material is wet-kneaded (30 rpm→10 min, 60 rpm→60 min) by the kneader described above (S23).

After that, SBR as a binder for negative electrode is added to the kneaded material obtained by the wet-kneading described above, and the kneaded material is further wet-kneaded (30 rpm→10 min, 40 rpm→30 min) by the kneader described above (S24).

Then, a mixture obtained by the wet-kneading described above is agitated/defoamed using a planetary type agitating/defoaming apparatus (KK100 (MAZERUSTAR (registered trademark)) manufactured by KURABO INDUSTRIES LTD. (registered trademark)) (S25) to obtain the negative electrode slurry as a resultant material.

1-3. Carbon Slurry Preparation Step

Figure 3:
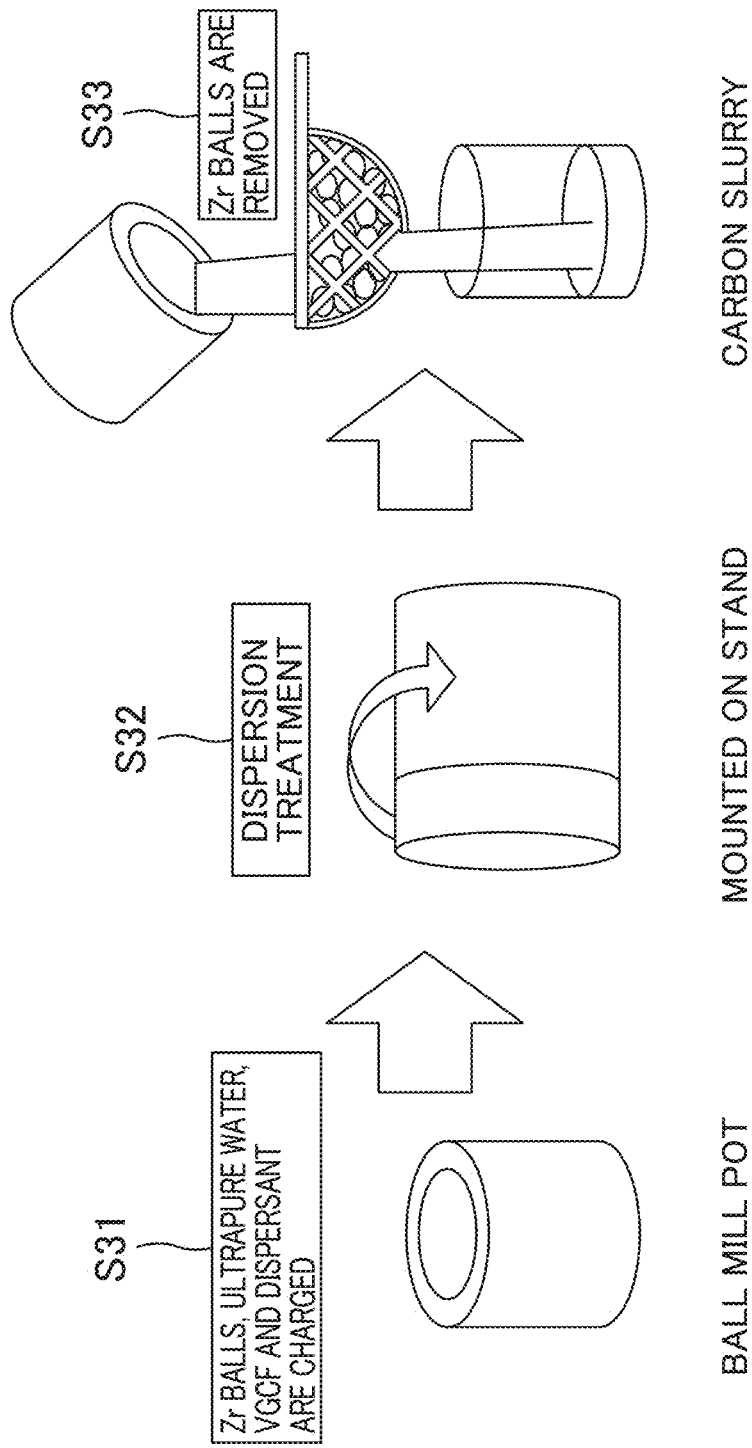
FIG. 3 is a diagram illustrating a carbon slurry preparation step S30.

FIG. 3 illustrates the foregoing carbon slurry preparation step S30. In this carbon slurry preparation step S30, VGCF as a conductive material is dispersed by using a ball mill disperser.

In the carbon slurry preparation step S30, firstly, zirconia balls (Zr balls, Ø3) as media, ultrapure water, VGCF and a dispersant are charged in a ball mill pot (nylon ball mill pot, 0.3l (Ø90×100 mm)) of a ball mill (manufactured by FDK CORPORATION (registered trademark)) (S31).

Then, the ball mill pot is mounted on a stand and the stand is rotated for a predetermined time (rotational speed 90 rpm) (hereinafter, this treatment is also referred to as a dispersion treatment) (S32). After the dispersion treatment, the dispersed material is passed through meshes to remove the zirconia balls (S33), and carbon slurry can be obtained as filtrate.

2. Evaluation and Verification 2-1. Evaluation of Carbon Slurry Preparation Step To verify such as an effect of the carbon slurry preparation step S30 shown in FIG. 3, a plurality of samples of carbon slurry was prepared by the carbon slurry preparation step S30. FIG. 4 shows a compounding ratio of VGCF, the dispersant, the zirconia balls and the ultrapure water which have been charged into the ball mill pot when the samples are prepared. As shown in FIG. 4, a nonionic polymer (S3M-64, manufactured by NOF CORPORATION (registered trademark)) was used as a dispersant. Further, the rotational speed of the stand in the dispersion treatment was 90 rpm. Furthermore, for comparative verification purposes, samples of carbon slurry were also prepared in accordance with the carbon slurry preparation step S30 even in a case where the dispersant was not used. Note that, the compounding ratio of the components other than the dispersant was the same as the case where the dispersant was used.

2-1-1. Measurement Result of Particle Size

FIG. 5 shows measurement results of particle sizes of respective samples. In FIG. 5, a "sample 0" is a sample before dispersion treatment (before charging the dispersant), "samples 1 to 3" are samples using the dispersant, and "samples 4, 5" are samples in which the dispersant is not used. Further, in the "samples 1 to 3", the dispersion treatments were performed for 5 hours, 20 hours and 25 hours, respectively. In the "samples 4, 5", the dispersion treatments were performed for 20 hours and 24 hours, respectively.

As shown in FIG. 5, it can be seen that the dispersion treatment shortens a fiber length (median diameter) of VGCF. Further, when the dispersant is used, the fiber length (median diameter) is shorter than the case where the dispersant is not used.

2-1-2. SEM Observation

Figure 6A:
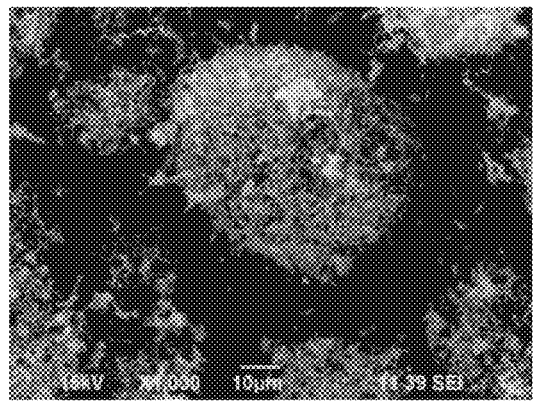
FIG. 6A is a SEM image of a sample 0 (before dispersion treatment).
Figure 6B:
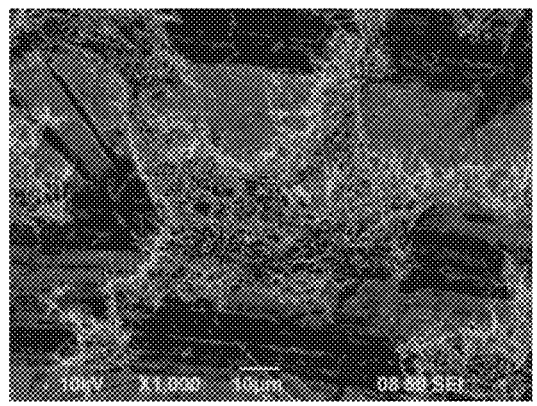
FIG. 6B is a SEM image of a sample 3 (after dispersion treatment (with dispersant)).
Figure 6C:
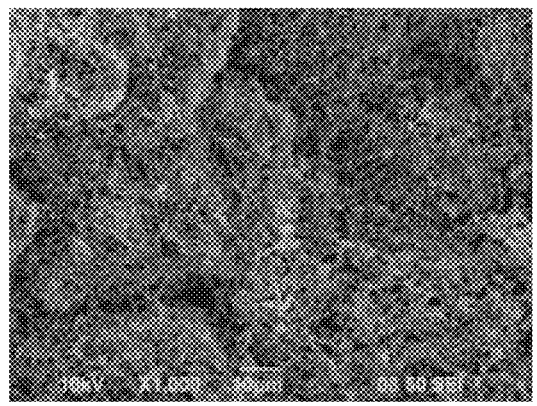
FIG. 6C is a SEM image of a sample 5 (after dispersion treatment (without dispersant)).

Each of the samples was observed by a scanning electron microscope (SEM). FIG. 6A shows an SEM image of the "sample 0" (before dispersion treatment), FIG. 6B shows an SEM image of carbon slurry of the "sample 3" (after dispersion treatment, with dispersant), and FIG. 6C shows an SEM image of the "sample 5" (after dispersion treatment, without dispersant).

As shown in FIG. 6A, each VGCF in the carbon slurry of the "sample 0" (before dispersion treatment) had a cocoon shape, and VGCF as a simple substance of a fiber was not able to be confirmed. On the other hand, as shown in FIG. 6B and FIG. 6C, many of VGCF in carbon slurry after dispersion treatment were disentangled in a fiber form, and thus it could be seen that VGCF was dispersed by performing the dispersion treatment. Moreover, as shown in FIG. 6B, while VGCF having a cocoon shape disappeared in the "sample 3" (after dispersion treatment, with dispersant), VGCF having a cocoon shape still remained in the "sample 5" (after dispersion treatment, without dispersant) as shown FIG. 6C, and thus it could be seen that the dispersion was promoted by using the dispersant.

Accordingly, VGCF is dispersed by performing the dispersion treatment by the ball mill disperser, and also the dispersion of VGCF can be promoted by using the dispersant.

2-1-3. Measurement of Viscosity and Elastic Modulus

FIG. 7 demonstrates measurement results of viscosity and an elastic modulus of each of the "sample 0" (before dispersion treatment), the "sample 3" (after dispersion treatment, with dispersant), and the "sample 5" (after dispersion treatment, without dispersant). As shown in FIG. 7, the viscosity and elastic modulus (tan δ) decreases due to the dispersion treatment. Further, when the dispersant is used in the dispersion treatment, the viscosity is lower compared to the case where the dispersant is not used.

2-1-4. Coating Test

A coating test was performed by applying each of the "sample 0" (before dispersion treatment), the "sample 3" (after dispersion treatment, with dispersant) and the "sample 5" (after dispersion treatment, without dispersant) on an aluminum foil simulating a collector under the condition shown in FIG. 8.

FIG. 9 demonstrates measurement results of surface roughness of each sample after the coating and drying. In FIG. 9, compared to the "sample 0" (before dispersion treatment), ten-point average roughness Rz of the "sample 3" (after dispersion treatment, with dispersant) and the "sample 5" (after dispersion treatment, without dispersant) are slightly increased, whereas both arithmetic average roughness (Ra) and a maximum height (Ry) thereof are decreased. Thus, it can be seen that the surface roughness tends to be reduced by the dispersion treatment. Further, when the "sample 3" (after dispersion treatment, with dispersant) and the "sample 5" (after dispersion treatment, without dispersant) are compared, the surface roughness when the dispersant is used tends to be reduced compared with a case where the dispersant is not used.

Figure 10A:
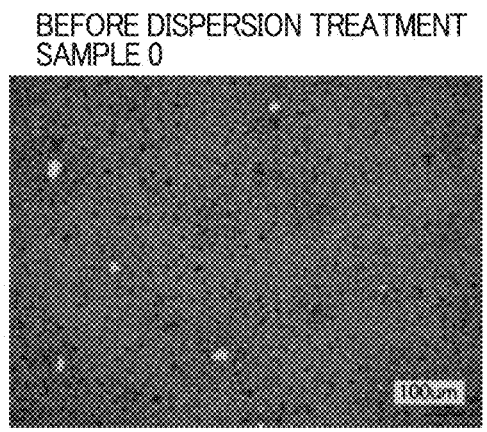
FIG. 10A includes observed images with a laser microscope, showing the surface of the sample 0 after the coating and drying.
Figure 10A:
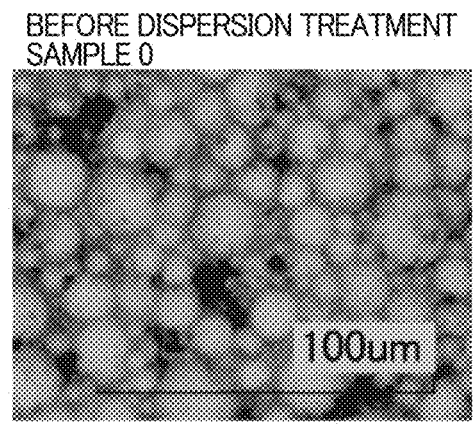
Figure 10B:
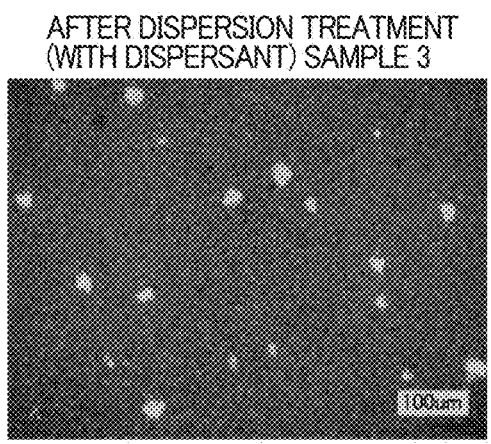
FIG. 10B includes observed images with a laser microscope, showing the surface of the sample 3 after the coating and drying.
Figure 10B:
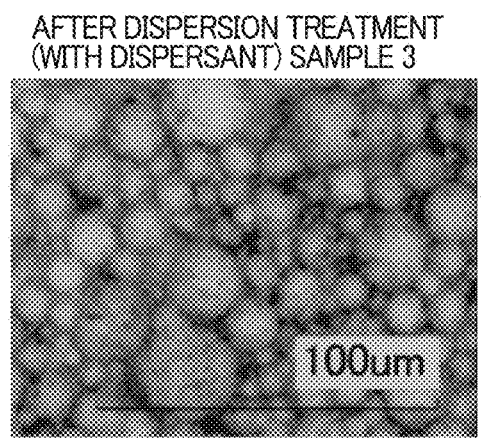
Figure 10C:
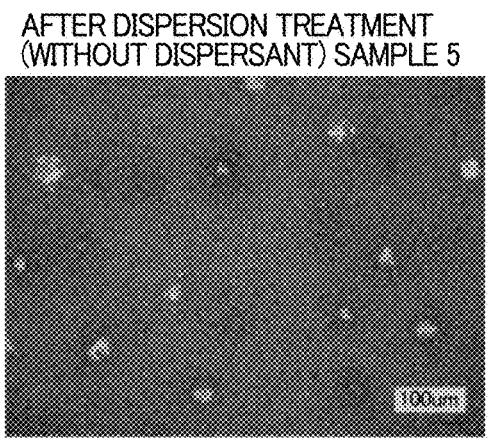
FIG. 10C includes observed images with a laser microscope, showing the surface of the sample 5 after the coating and drying.
Figure 10C:
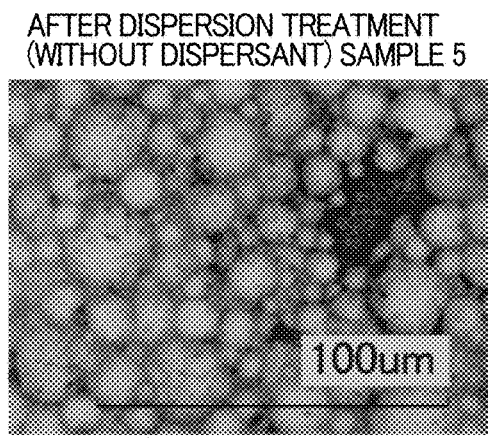

FIG. 10A to FIG. 10C include observed images with a laser microscope, showing the coated surfaces of the respective samples after the coating and drying. As shown in FIG. 10A, in the "sample 0" (before dispersion treatment), lumps of VGCF which are seemed like black stains in gaps among LTO are observed, and VGCF is not diffused on the coated surface. On the other hand, as shown in FIG. 10B and FIG. 10C, in the "sample 3" (after dispersion treatment, with dispersant) and the "sample 5" (after dispersion treatment, without dispersant), it can be confirmed that VGCF is diffused on the coated surface compared to the "sample 0" (before dispersion treatment). Further, while the lumps of VGCF are not observed in FIG. 10B, the lumps of VGCF can be partly confirmed in FIG. 10C. Thus, it can be seen that the diffusion of VGCF is promoted by the use of the dispersant.

As stated above, it can be recognized that a coating property of carbon slurry applied to the collector is improved by performing the dispersion treatment. In addition, the coating property of carbon slurry applied to the collector is further improved by using the dispersant.

2-2. Verification of Treatment Time

To verify a treatment time of the dispersion treatment in the carbon slurry preparation step S30, six samples of the carbon slurry ("samples 10 to 15") were prepared by changing each of the treatment times, and a particle size and a coated surface of each sample were observed. FIG. 11 shows composition of each sample (common to each sample).

2-2-1. Particle Size Observation

Figure 13:
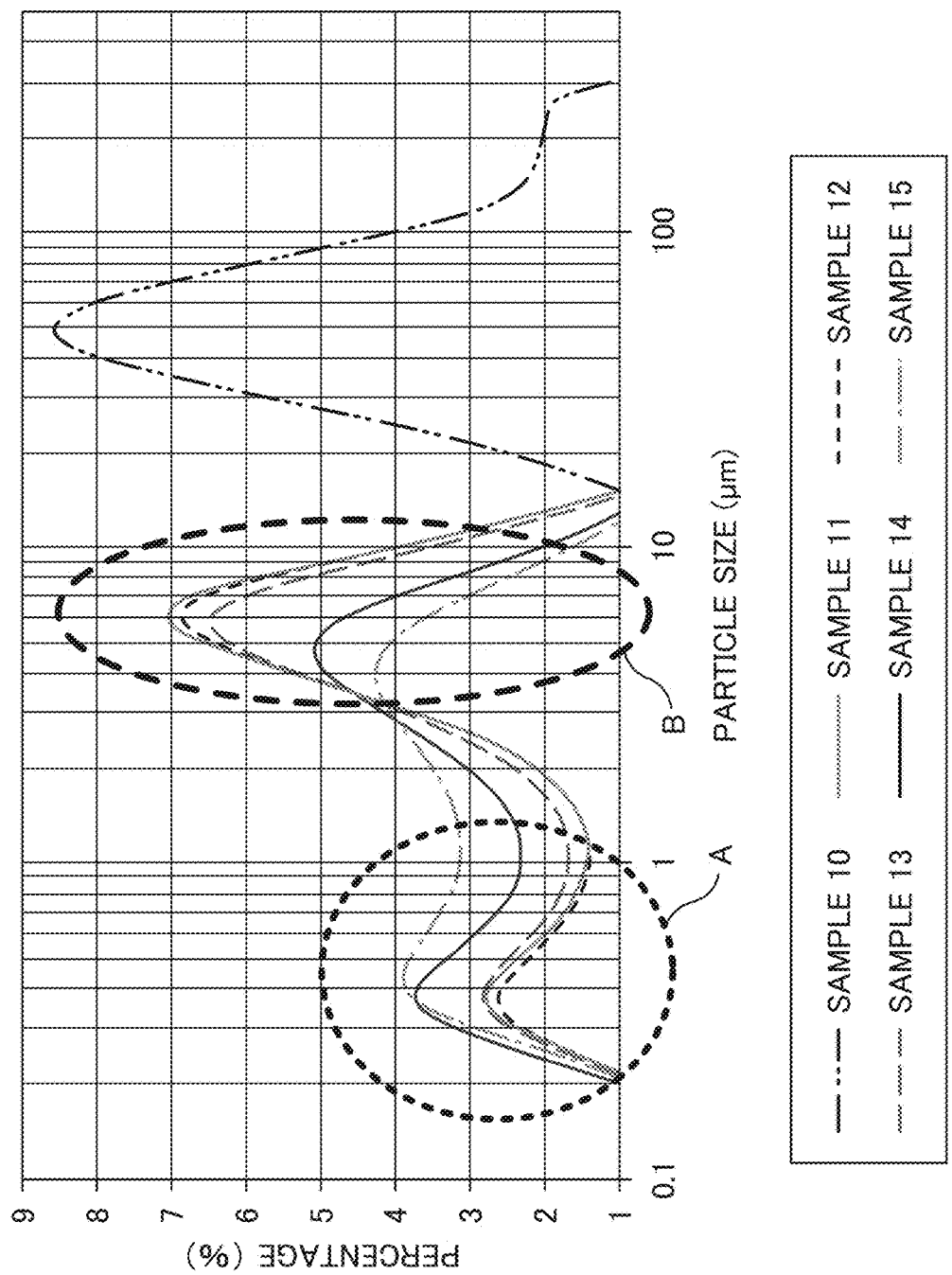
FIG. 13 is a graph showing distributions of particle diameters (particle size distributions) of respective samples in the evaluation of the treatment time.
Figure 14:
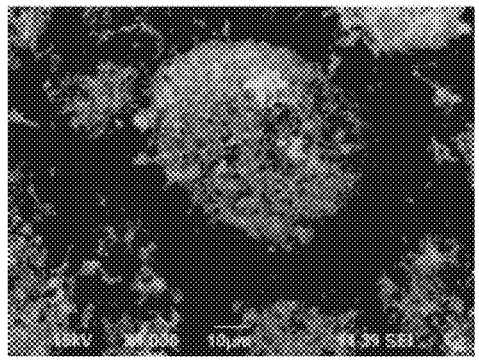
FIG. 14 includes SEM images of respective samples in the evaluation of the treatment time.
Figure 14:
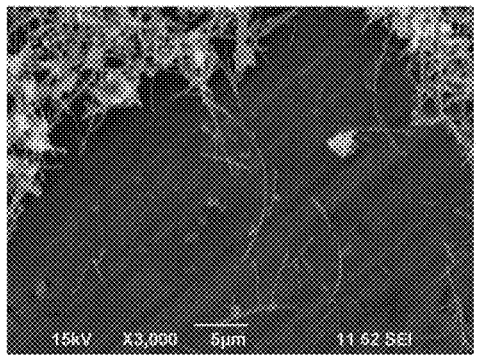
Figure 14:
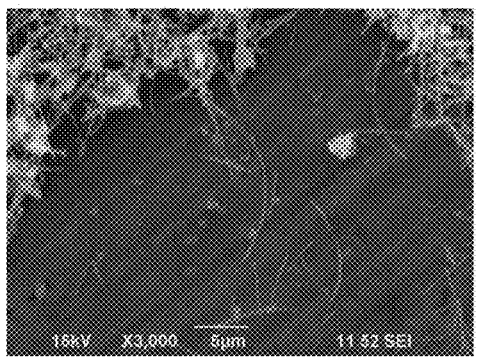
Figure 14:
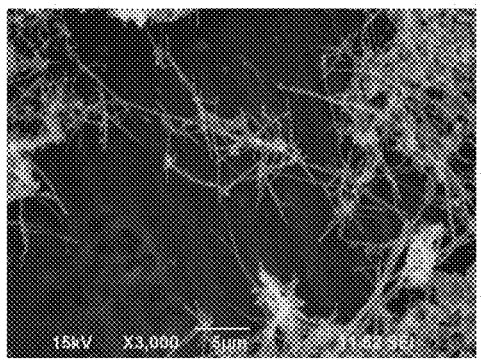
Figure 14:
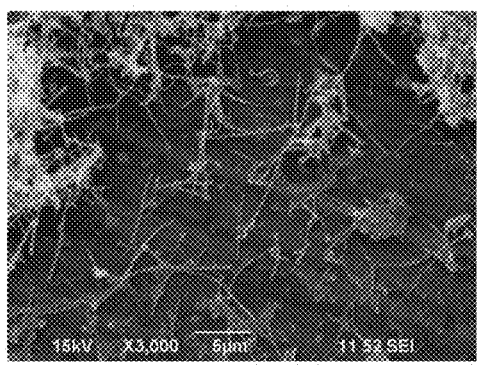
Figure 14:
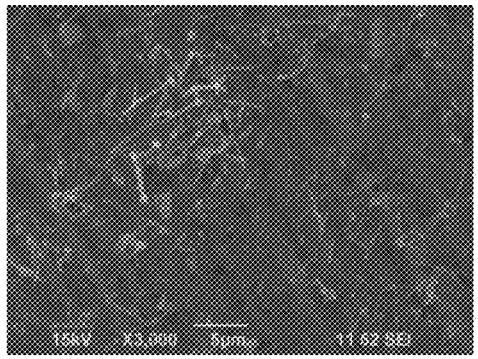

FIG. 12 shows measurement results of a particle size of each sample, FIG. 13 shows particle size distributions of each sample, and FIG. 14 shows SEM images of each sample. As shown in FIG. 13, the longer the treatment time is, the more the peak in an area surrounded by a broken line (B) is reduced, whereas the more the peak in an area surrounded by a dotted line (A) is increased. Among them, the decrease of the peak in the area shown by the broken line (B) corresponds to the fact that the longer the treatment time is, the more the VGCF having a cocoon shape is disentangled in a fiber form. On the other hand, the increase of the peak in the area shown by the dotted line (A) corresponds to the fact that the longer the treatment time is, the shorter the fibrous VGCF becomes by being torn off. Those can be confirmed also by the SEM images shown in FIG. 14.

2-2-2. Observation of Coated Surface

Figure 15A:
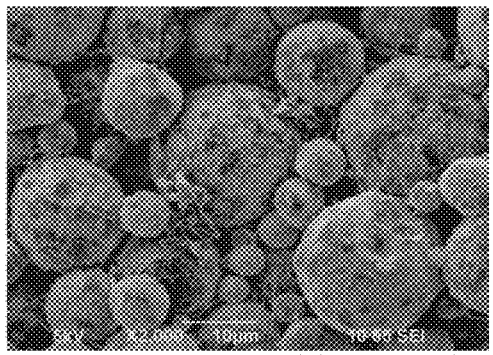
FIG. 15A includes SEM images of the coated surfaces of respective samples in the evaluation of the treatment time.
Figure 15A:
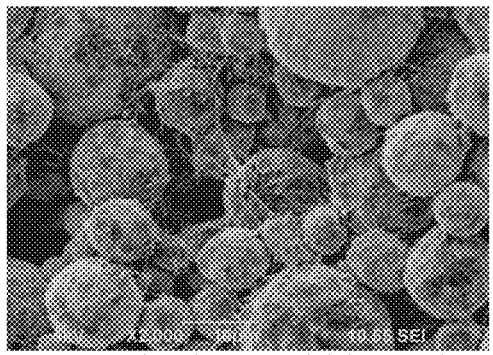
Figure 15A:
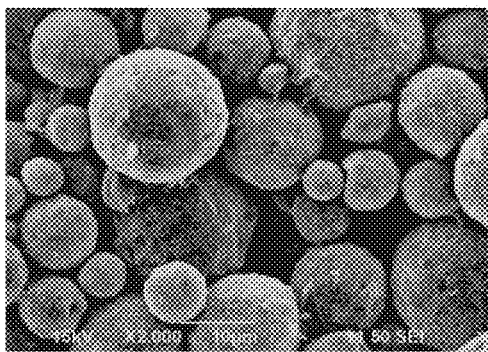
Figure 15A:
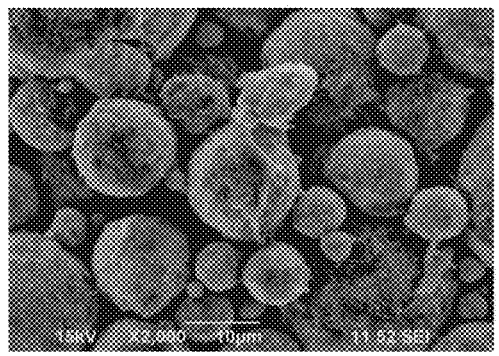
Figure 15A:
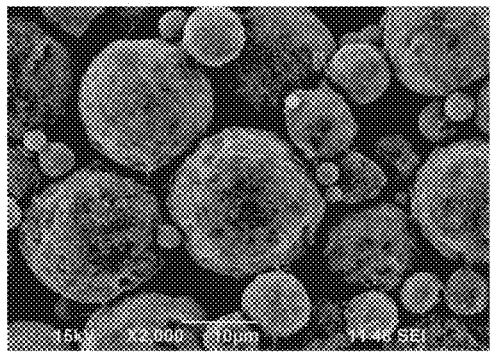
Figure 15A:
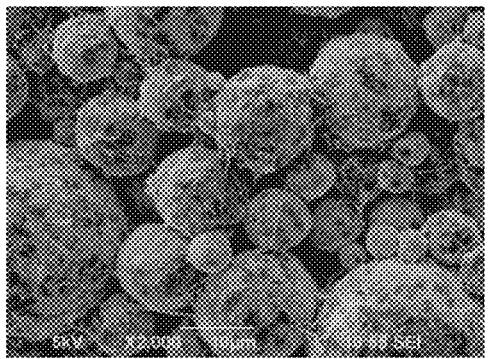

Respective samples ("samples 10 to 15") were applied to an aluminum foil simulating a collector, and the coated surfaces after drying were observed by a SEM and a laser microscope. FIG. 15A shows SEM images of the coated surface of each sample, and FIG. 15B shows laser microscope images of the coated surface of each sample.

As shown in FIG. 15A, in the "sample 10 (0 hours)" (before dispersion treatment), only the VGCF having a cocoon shape is observed, and a part that is disentangled in a fiber form cannot be confirmed. Further, in the "sample 11 (1 hour)", the "sample 12 (3 hours)" and the "sample 13 (5 hours)", although VGCF having a cocoon shape is not confirmed, lumps of VGCF can be confirmed in places. Further, when the respective samples are compared, it can be seen that the lumps of VGCF are decreased and become entirely in a fiber form in accordance with the increase of the treatment time. Particularly, in the "sample 14 (10 hours)" and the "sample 15 (25 hours)", the lumps of VGCF as confirmed in the "sample 13 (5 hours)" are hardly confirmed. Further, in the "sample 14 (10 hours)" and the "sample 15 (25 hours)", VGCF is cut and becomes shorter compared to that in the "sample 13 (5 hours)", and particularly in the "sample 15 (25 hours)", the fiber length of VGCF is shortened to approximately half of that in the "sample 12 (3 hours)" or the "sample 13 (5 hours)".

Figure 15B:
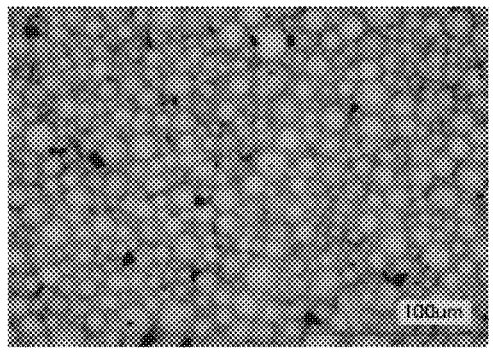
FIG. 15B includes laser microscope images of the coated surfaces of respective samples in the evaluation of the treatment time.
Figure 15B:
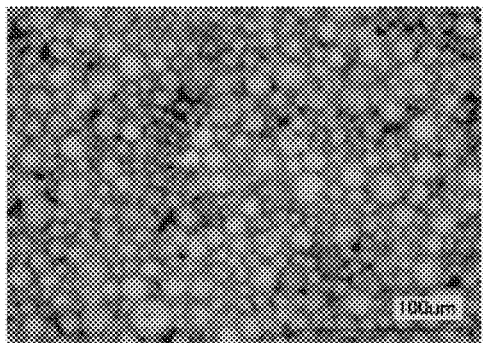
Figure 15B:
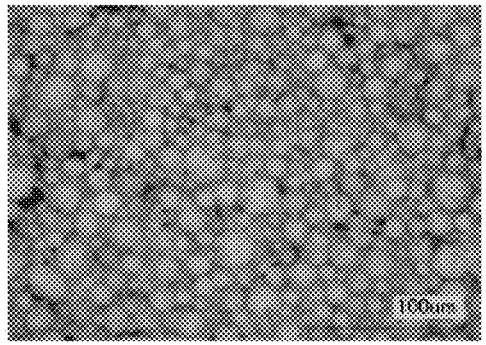
Figure 15B:
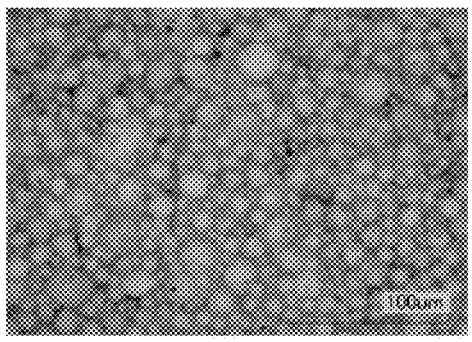
Figure 15B:
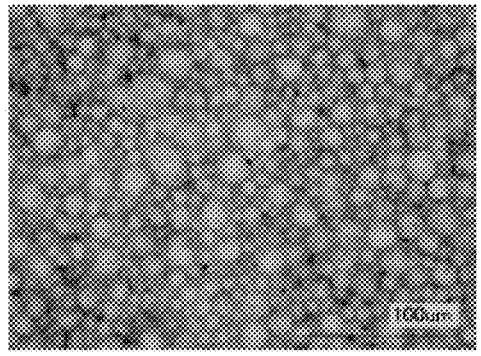
Figure 15B:
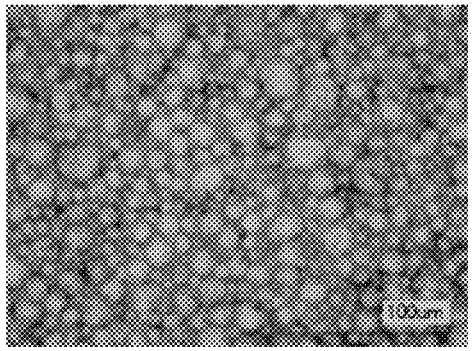

Further, as shown in FIG. 15B, in the "sample 11 (1 hour)" and the "sample 12 (3 hours)", although lumps of VGCF (black parts) are confirmed on the coated surface, the longer the treatment time is, the more the lumps of VGCF are decreased. Further, in the "sample 13 (5 hours)", the "sample 14 (10 hours)" and the "sample 15 (25 hours)", even though the lumps of VGCF are confirmed, the number of lumps in each sample is few, and the size of each lump is also small.

Consequently, for example, the following can be found. That is, from the result of the "sample 13 (5 hours)" in FIG. 15A, it is recognized that VGCF is dispersed to be a fiber form when the treatment time is set to 5 hours, and also the amount of VGCF that has been cut is relatively small compared with the "sample 14 (10 hours)". In addition, from the results of the "sample 11 (1 hour)" and the "sample 12 (3 hours)" in FIG. 15B, it is recognized that VGCF is unable to be disentangled completely and is deposited on the coated surface when the treatment time is set to 1 to 3 hours. With these factors considered, it is preferable that the treatment time of dispersion in the carbon slurry preparation step S30 is set to 5 to 10 hours.

2-3. Charge-Discharge Cycle Test

To evaluate the negative electrode slurry prepared by the negative electrode slurry preparation step S20, a charge-discharge cycle test (charging and discharging were repeated for three cycles (charging and discharging with a constant current (4 mA (corresponding to 0.2 C), termination voltage of 2V-1V))) was performed for each of the lithium secondary battery formed by using the negative electrode slurry prepared by the negative electrode slurry preparation step S20 (hereinafter, also referred to as an evaluation battery) and the lithium secondary battery formed by using the negative electrode slurry prepared by the above-mentioned comparison step S10 (hereinafter, also referred to a comparative battery). Two samples were prepared for each of the evaluation battery and the comparative battery. The compounding ratio of VGCF of the negative electrode slurry of each sample was 2.5%.

Figure 16A:
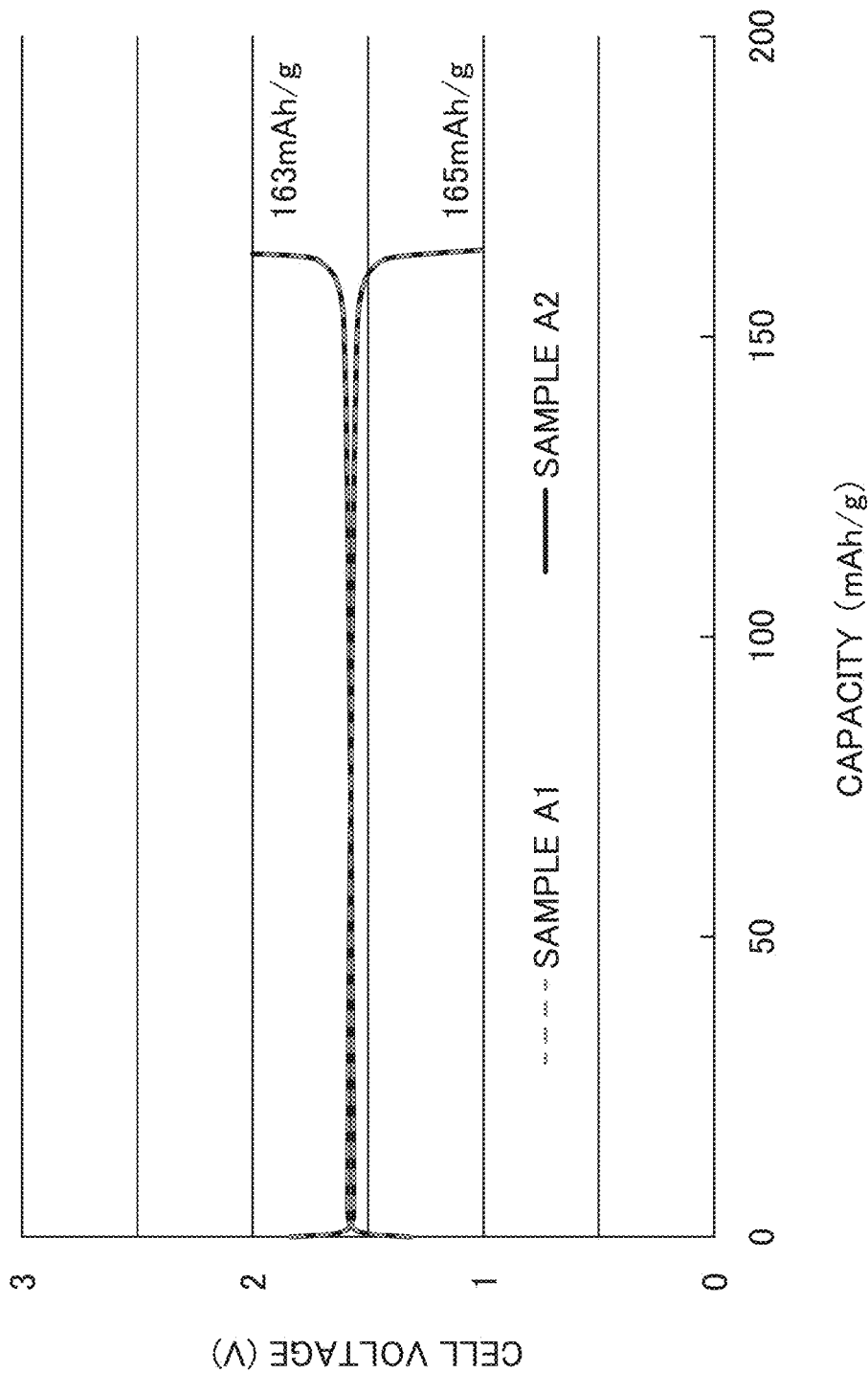
FIG. 16A is a graph showing a result of a charge-discharge cycle test performed for evaluation batteries.
Figure 16B:
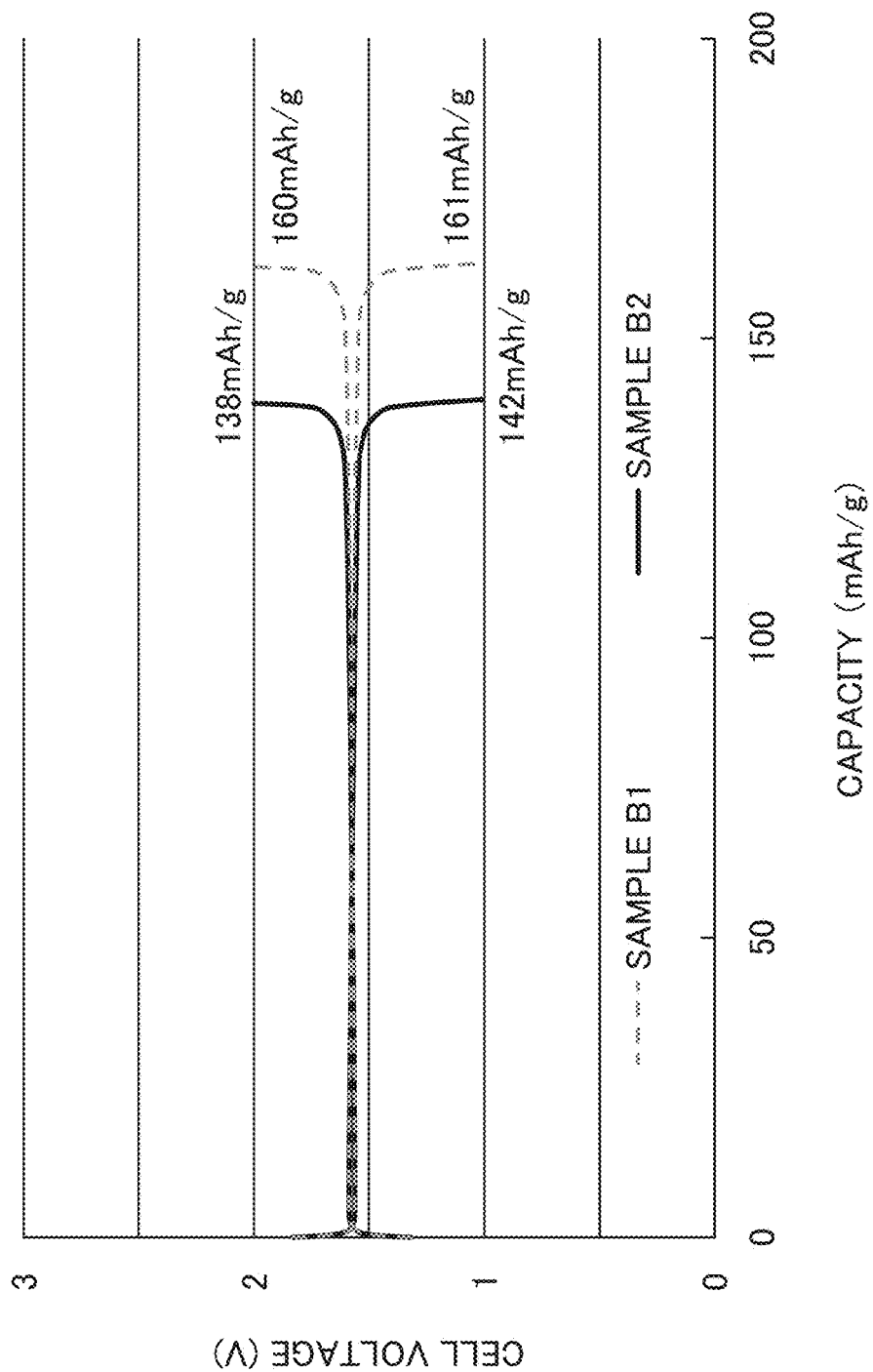
FIG. 16B is a graph showing a result of a charge-discharge cycle test performed for comparative batteries.

FIG. 16A demonstrates a result of the charge-discharge cycle test performed for the evaluation battery, and FIG. 16B demonstrates a result of the charge-discharge cycle test performed for the comparative battery, respectively. Note that, numerical values shown in FIG. 16A and FIG. 16B are current density obtained by measuring respective samples.

As shown in FIG. 16A, two samples A1 and A2 of the evaluation battery have substantially the same charge-discharge cycle characteristics. Thus, it can be seen that the evaluation batteries have small variations in characteristics, so that stable battery performance can be obtained. On the other hand, as shown in FIG. 16B, two samples B1 and B2 of the comparative battery do not have the same charge-discharge cycle characteristics, and thus it can be seen that the cycle characteristics are varied between the samples.

Accordingly, it can be recognized that when the lithium secondary battery is constituted by using the negative electrode slurry formed in the negative electrode slurry preparation step S20, the charge-discharge cycle characteristics can be improved.

2-4. Relationship Between Fiber Length of VGCF and Capacity Attenuation Rate

Figure 17B:
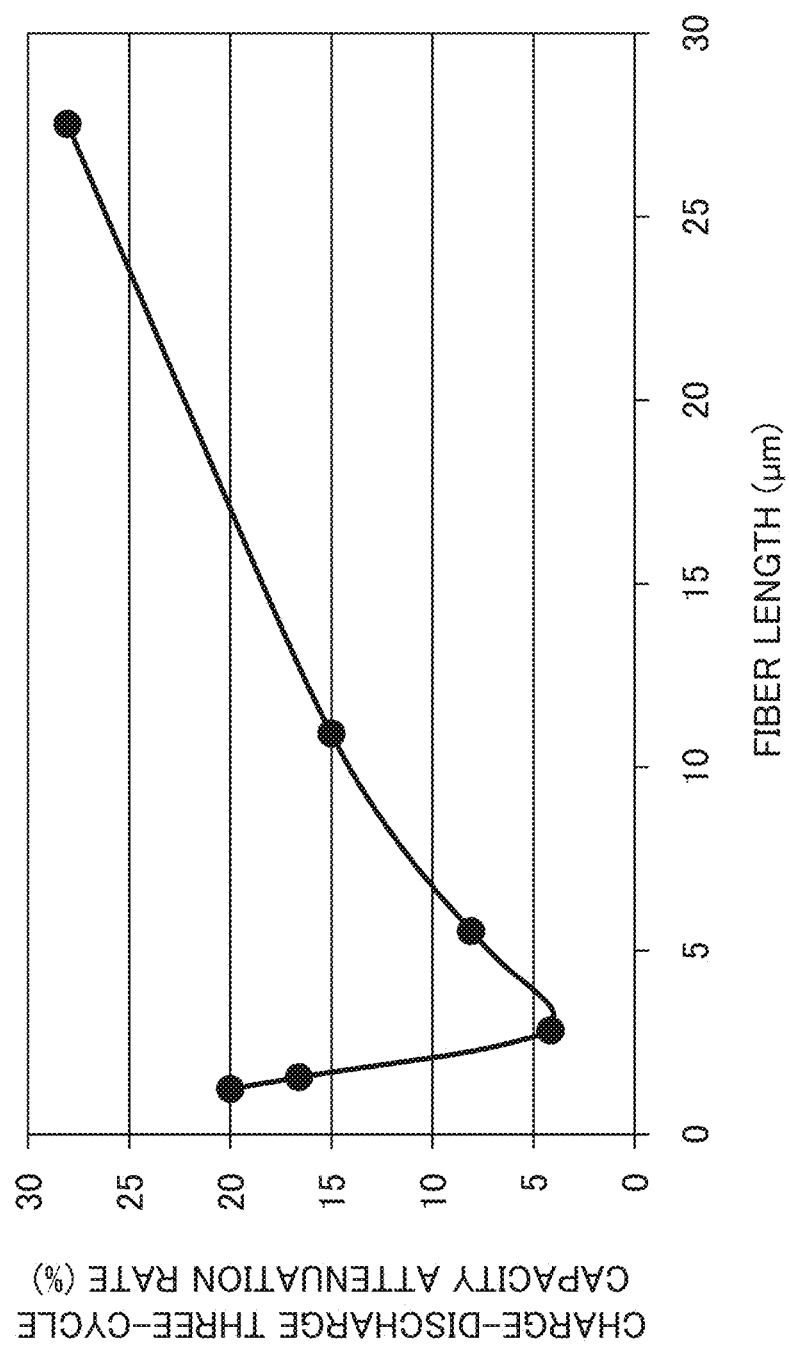
FIG. 17B is a graph corresponding to data in FIG. 17A.

The relationship between the fiber length of the VGCF in the negative electrode slurry prepared by the negative electrode slurry preparation step S20 and a charge-discharge three-cycle capacity attenuation rate of the lithium secondary battery constituted by using the prepared slurry was measured. FIG. 17A shows measurement results and FIG. 17B shows a graph provided based on FIG. 17A.

As shown in FIG. 17B, it can be seen that when the fiber length is in a range of 2 to 7 µm, the charge-discharge three-cycle capacity attenuation rate is greatly decreased. Thus, it is considered preferable to adjust the treatment time of dispersion or the like so that the fiber length of VGCF contained in the negative electrode slurry is within 2 to 7 µm in the carbon slurry preparation step S30.

The above description is merely for facilitating the understanding of the invention, but is not meant to be interpreted in a manner limiting the scope of the invention. The invention can of course be altered and improved without departing from the gist thereof and includes functional equivalents.

For example, in the embodiments described above, although the fibrous carbon is dispersed by using the ball mill disperser, it can be considered that a similar effect can be obtained even by the use of other media dispersion methods such as a bead mill dispersion method. Further, it can be considered that a similar effect can be obtained even by the use of an ethylenic dispersant, a polymeric dispersant or an amine dispersant besides the nonionic dispersant.

REFERENCE SIGNS LIST

S10: comparison step, S20: negative electrode slurry preparation step, S30: carbon slurry preparation step

The invention claimed is:

1. A method of manufacturing electrode slurry for a lithium secondary battery, the method comprising:
   a first step of obtaining a kneaded material by dry-kneading an electrode active material and a binder;
   a second step of dispersing a solvent comprising fibrous carbon, water, and a nonionic polymer, using a media-type disperser to obtain a slurry, wherein the fibrous carbon is a conductive material;
   a third step of wet-kneading the slurry obtained in the second step and the kneaded material obtained in the first step and water;
   a fourth step of wet-kneading by adding water to a kneaded material obtained in the third step;
   a fifth step of wet-kneading by adding a binder to a kneaded material obtained in the fourth step; and
   a sixth step of obtaining an electrode slurry to be applied to a collector by agitating and defoaming a kneaded material obtained in the fifth step,
   a fiber length of the fibrous carbon in the electrode slurry obtained in the sixth step being 2 to 7 µm.

2. The method of manufacturing the electrode slurry for the lithium secondary battery according to claim 1, wherein the media-type disperser is a ball mill disperser.

3. The method of manufacturing the electrode slurry for the lithium secondary battery according to claim 1, wherein
   the second step is independent of the first step, and
   the media-type disperser used in the second step is a ball mill disperser using zirconia balls (Zr balls) as media.

4. The method of manufacturing the electrode slurry for the lithium secondary battery according to claim 2, wherein
   the second step is independent of the first step, and
   the second step is dispersing the solvent for 5 to 10 hours by the ball mill disperser.

5. The method of manufacturing the electrode slurry for the lithium secondary battery according to claim 1, wherein the media-type disperser is a bead mill disperser.

6. The method of manufacturing the electrode slurry for the lithium secondary battery according to claim 1, wherein the fibrous carbon is a carbon nanotube.

7. The method of manufacturing the electrode slurry for the lithium secondary battery according to claim 6, wherein the fibrous carbon is a vapor grown carbon fiber.

8. An electrode slurry for a lithium secondary battery, the electrode slurry being manufactured by the method according to claim 1.

* * * * *